July 14, 1970 P. A. SCHERER 3,520,264
HYDROFOIL CARGO SHIP
Filed Oct. 16, 1967
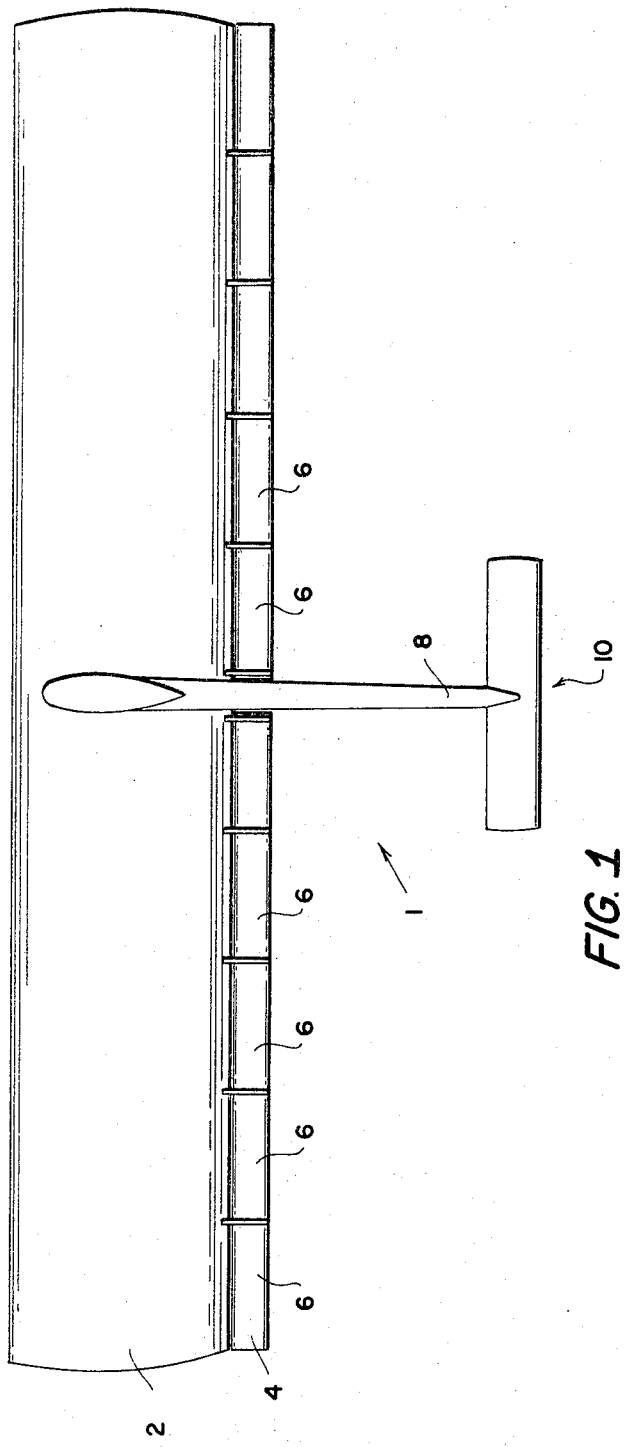
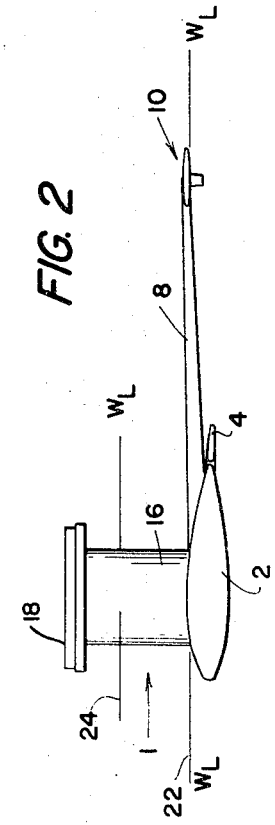
INVENTOR
PAUL A. SCHERER
ATTORNEY

United States Patent Office 3,520,264
Patented July 14, 1970

3,520,264
HYDROFOIL CARGO SHIP
Paul A. Scherer, Marietta, Bell Station Road,
Glenn Dale, Md. 20769
Filed Oct. 16, 1967, Ser. No. 679,959
Int. Cl. B63b 1/28; B63g 8/18
U.S. Cl. 114—66.5    10 Claims

ABSTRACT OF THE DISCLOSURE

A hydrofoil ship having a large cargo-carrying hydrofoil for subsurface operation, and having a long strut for supporting a bridge and crew spaces, a symmetrical flap and a fuselage and an empennage are described herein.

HISTORY

Cargo vessels have long plied the seas of the world without significant changes in hull forms. Improvements have been made in engines and drives, and hulls have been modified to increase speed and to reduce drag, but the results of changes have been slight—certainly not in orders of magnitude. Recent improvements have sought to solve ocean transportation problems by building tankers of large sizes, but even the new jumbo tankers have basically the same hulls that have been used for many years.

Costs of shipping materials by sea are influenced to a large extent by the speed at which a ship can travel between ports. The life of a ship can be estimated when it leaves the ways. The ship's costs can be divided over its expected life, yielding a capital cost per year. Crew and maintenance are an additional part of fixed overhead. Annual income and profits which a ship produces are roughly related to its predicted number of cargo carrying voyages per year. A search has gone on for faster ships, and while speeds have been improved, no significant breakthrough has been made.

SUMMARY OF INVENTION

In a copending application entitled Hydrofoil Propulsion and Control Methods and Apparatus, rigidly mounted foils with systems for controlling the circulation around hydrofoils and the lift of hydrofoils have been described.

The present invention employs large displacement foils which carry cargo, usually bulk cargo, in the foils which fly far below the ocean surface where surface disturbances have reduced amplitude. The foils support a strut which in turn supports bridges and crew spaces above the surface of the water. The foils have external flaps to control circulation of water over their surface, damping the effects of sea patterns upon the foils, controlling dynamic lift by eliminating flow variations over the foils, resulting from wave action. So that circulation may be controlled section by section to "warp" the foils in response to sea patterns which are oriented at an angle to the foil, the external flap is divided into multiple sections.

Ships of the present invention may have empennages or tail surfaces to promote control and stabilization. Foil section horizontal and vertical stabilizers are used. The latter extends downward from the former, and they may be fixed, or they may be used respectively for the ship's rudder and elevators.

A fuselage connects the empennage with the main foil. The fuselage is telescoping; it is extended in ocean travel. It may be contracted before entering a harbor to bring the empennage tightly against or partially overlying the main foil so that the ship can be maneuvered sideways in conventional channels and docks.

Propulsion apparatus for the craft is located in an after portion of the main foil. Engines may drive trailing edge mounted multiple propellers having blades pivoted for constant lift. Such blades will maintain constant circulation over the foil, automatically tending to correct sea pattern induced variations, as described in a copending application entitled Foil Systems, Ser. No. 396,806, filed Sept. 10, 1964.

Pumps may be mounted within the foil, with boundary layer control intakes near the trailing edge feeding a plurality of jet producing pumps mounted just forward of the trailing edge. The pumps may have elongated axes oriented perpendicular to the foil chord, parallel to span. The pumps may be of an unconventional design similar to a "squirrel cage" fan with circumferential acceleration inducing blades. Pump functions are similar to fan functions—moving a high volume of fluid with a low increase in pressure head.

One embodiment of hydrofoil craft is designed for operation in a 32 foot minimum depth harbor. The thickness of the mail foil is about 35 feet; its upper surface is awash at rest.

The foil is a NACA $66_2$–015 section. Span of the foil is 1,167 feet. Chord of the main foil is 233.7 feet; the flap has a cord of 23.37 feet. The strut is 65 feet long. The ship is designed for 144,000 tons dead weight; displacement is 182,000 tons.

In a tanker configuration, the foil is divided into 32 feet wide compartments by a series of ribs; flexible skins are connected in a line around the mid-points of each compartment. The skins and the rigid upper surfaces of the foil compartments comprise tanks. When the tanks are empty the compartments are flooded and the skins are inverted against the roofs of the compartments. Pumping a bulk cargo into the tanks forces seawater out of the foil. When the oil is removed, the foil is flooded. Oil may be pumped out of the tanks by pumping water or air into the bottoms of the compartments.

One objective of this invention is the provision of a cargo vessel having a cargo-carrying hydrofoil.

Another objective of this invention is the provision of a deep-running hydrofoil tanker having a surface piercing strut and supporting above the surface a bridge and crew spaces.

Another objective of the invention is the provision of a cargo carrying hydrofoil having a fuselage and an empennage.

This invention has as a further objective the provision of a cargo carrying hydrofoil having an empennage and an extensible and contractable fuselage.

A further objective of this invention is the provision of a cargo carrying hydrofoil having a symmetrical external flap.

Further objectives of this invention will be apparent from the specification and from the drawings.

BRIEF DESCRIPTION OF DRAWINGS

FIG. 1 is a side elevation of a preferred embodiment of a cargo carrying hydrofoil ship of this invention.

FIG. 2 is a plan view of the ship shown in FIG. 1.

DETAILED DESCRIPTION OF DRAWINGS

In FIGS. 1 and 2 a hydrofoil ship is generally indicated by the numeral 1. Long span hydrofoil 2 is a cargo carrying hydrofoil. In the present example, the ship is a tanker, a hydrofoil 2 is designed for carrying petroleum and its products.

A symmetrical external flap 4 is mounted aft of the main hydrofoil 2; the chord of flap 4 is ten percent of the chord of cargo carrying hydrofoil 2. Flap 4 may be pivoted upward or downward to change flow characteristics over foil 2, and the flap may be pivoted upward when in port.

Flap 4 is divided into independenty operable sections 6 so that flow characteristics may be varied over adjacent sections of the surface of foil 2. That division provides "warp" in the foil, allowing lateral sections of the foil to adjust circulation so that a seaway pattern flowing at an angle to foil motion through the water will not change lift on adjacent sections of the foil and will not apply warping strain on foil 2.

Fuselage 8 extends rearward from the center of hydrofoil 2. Empennage 10 is mounted on the remote end of fuselage 8. Empennage 10 has vertical stabilizers and horizontal stabilizers which may be used as rudders and elevators. Fuselage 8 telescopes, bringing the empennage close aboard foil 2 so that the ship may be maneuvered sideways in port.

Strut 16 extends vertically from the center of the cargo carrying body 2. A bridge and crew's space 18 are provided atop strut 16. Bridge 18 has three control centers; one is in the forward part of the superstructure for command of the ship at sea. The other control centers are in the sides of the bridge for maneuvering in either lateral direction in port, when the fuselage is telescoped and the empennage is close hauled.

Loaded and at rest the uppermost surface of the cargo carrying hydrofoil 2, and a considerable part of empennage 10 is above mean sea level as indicated by at-rest water line 22. Underway, cargo carrying foil 2, fuselage 8 and empennage 10 are deeply submerged, as indicated by water line 24, to reduce surface effects.

The ship may be propelled and flow controlled by internal pumps with adjustable intakes and discharge ports as discussed in a copending application entitled Hydrofoil Propulsion and Control Methods and Apparatus. Alternatively, the ship may be moved by external constant thrust propellers as described in copending application entitled Foil Systems, Ser. No. 396,806, filed Sept. 10, 1964. Reversing jets are provided in the leading edge of foils 2 and maneuvering jets are mounted in lateral extremities of the foils.

Although this invention has been described in part by specific example, many modifications and other uses of the invention will be apparent to those skilled in the art. Therefore, this invention is not limited to the specific embodiments described herein. The scope of the invention is defined only in the appended claims.

I claim:

1. A hydrofoil ship comprising at least one cargo carrying hydrofoil, means for controlling flow about hydrofoil surfaces, means for controlling flow about laterally adjacent sections of surface of the hydrofoil, at least one relatively thin fuselage section extending aft from the at least one cargo carrying hydrofoil, the fuselage section being extendable and contractable, thereby respectively permitting extending the fuselage into operable position at sea and contracting the fuselage and closely hauling a remote end thereof in port, and an empennage mounted on an end of the fuselage remote from the at least one cargo carrying hydrofoil, the empennage having horizontal and vertical stabilizer hydrofoils.

2. A hydrofoil ship comprising at least one cargo carrying hydrofoil, at least one strut projecting upward from the at least one cargo carrying hydrofoil, a bridge mounted on the at least one strut remote from the at least one cargo carrying hydrofoil, at least one fuselage section mounted rearward on the at least one cargo carrying hydrofoil and at least one empennage mounted on the end of the fuselage remote from the at least one cargo carrying hydrofoil, the empennage having a horizontally oriented hydrofoil and a vertically oriented hydrofoil mounted beneath the horizontally oriented hydrofoil, the fuselage being contractible, whereby the empennage and the cargo carrying hydrofoil may be juxtaposed.

3. A hydrofoil ship comprising a fully submerged horizontally oriented cargo-containing hydrofoil elongated in a direction transverse to a normal direction of movement of the ship underway at sea, the hydrofoil having its horizontal chord greater than its vertical thickness, and said cargo containing hydrofoil comprising a majority of the ship, and means for controlling flow about hydrofoil surfaces.

4. The hydrofoil ship of claim 3 wherein the means for controlling flow about hydrofoil surfaces comprises a plurality of adjacent horizontally oriented auxiliary foil means for varying flow over a plurality of sections of a span of the hoydrofoil.

5. The hydrofoil ship of claim 4 further comprising a surface-piercing foil-shaped strut mounted centrally on the horizontally oriented cargo-carrying hydrofoil and extending vertically upward therefrom, and a bridge and crew spaces mounted atop the strut and spaced upward from a sea surface.

6. The hydrofoil ship of claim 3 comprising a relatively thin submerged fuselage section extending aft from the cargo containing hydrofoil, and an empennage mounted on the end of the fuselage remote from the cargo containing hydrofoil, the empennage having a unitary and rigid horizontal hydrofoil and a vertical stabilizer hydrofoil.

7. A hydrofoil ship comprising a relatively large horizontally oriented cargo containing hydrofoil, a relatively small sea surface piercing strut projecting upward from the cargo containing hydrofoil, and a bridge mounted on the strut remote from the cargo containing hydrofoil and spaced from the sea surface by the strut, the cargo containing hydrofoil comprising a majority of the ship.

8. The hydrofoil ship of claim 7 further comprising an external flap mounted aft of the cargo containing hydrofoil, the flap having a span commensurate with a span of the cargo containing hydrofoil, and the flap being divided into a plurality of independently movable adjacent horizontally oriented auxiliary foil sections for controlling flow over spanwise sections of the hydrofoil.

9. The hydrofoil ship of claim 7 further comprising a submerged fuselage section mounted rearward on the cargo containing hydrofoil, and an empennage mounted on an end of the fuselage remote from the cargo containing hydrofoil, the empennage having a horizontally oriented hydrofoil and a vertically oriented hydrofoil.

10. The hydrofoil ship of claim 7 wherein the cargo containing hydrofoil is divided into compartments, and wherein flexible skins are connected in a line around midpoints of each compartment, the skins and upper surfaces of the compartments forming tanks, whereby when the tanks are empty, compartments may be flooded and skins inverted against upper surfaces of the compartments.

References Cited

UNITED STATES PATENTS

| | | | |
|---|---|---|---|
| 1,436,902 | 11/1922 | Perley | 114—56 |
| 3,183,871 | 5/1965 | Reder | 114—66.5 |
| 3,347,197 | 10/1967 | Scherer | 114—66.5 |
| 2,097,985 | 11/1937 | Maryott. | |
| 2,550,220 | 4/1951 | Bussei | 114—66.5 |
| 2,998,790 | 9/1961 | Mason | 114—16 X |
| 3,407,770 | 10/1968 | Bailey | 114—66.5 |

ANDREW H. FARRELL, Primary Examiner

U.S. Cl. X.R.

114—16